US010471910B2

(12) United States Patent
Reighard

(10) Patent No.: US 10,471,910 B2
(45) Date of Patent: Nov. 12, 2019

(54) VEHICLE INTERIOR PANEL WITH SCULPTED SURFACE

(71) Applicant: Faurecia Interior Systems, Inc., Auburn Hills, MI (US)

(72) Inventor: Robert P. Reighard, Toledo, OH (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 280 days.

(21) Appl. No.: 14/574,552

(22) Filed: Dec. 18, 2014

(65) Prior Publication Data

US 2016/0176364 A1    Jun. 23, 2016

(51) Int. Cl.
| | |
|---|---|
| *B29C 44/12* | (2006.01) |
| *B29C 44/14* | (2006.01) |
| *B60R 13/02* | (2006.01) |
| *B32B 38/00* | (2006.01) |
| *B29C 67/00* | (2017.01) |
| *B29L 31/30* | (2006.01) |
| *B29K 75/00* | (2006.01) |

(52) U.S. Cl.
CPC ...... *B60R 13/0243* (2013.01); *B29C 67/0029* (2013.01); *B32B 38/0012* (2013.01); *B29C 44/1257* (2013.01); *B29C 44/146* (2013.01); *B29K 2075/00* (2013.01); *B29L 2031/3005* (2013.01); *B29L 2031/3014* (2013.01)

(58) Field of Classification Search
CPC ............ B60R 13/0243; B29C 44/1233; B29C 44/1219; B29C 44/1228; B29C 44/1238; B29C 44/1257; B29C 44/16; B29C 44/143
See application file for complete search history.

(56) References Cited

U.S. PATENT DOCUMENTS 3,434,478 A * 3/1969 Liebowitz et al. .... A41C 5/005
                                                       139/425 R
3,601,355 A * 8/1971 Fleck ...................... B29C 33/00
                                                       249/134

(Continued)

FOREIGN PATENT DOCUMENTS

DE   102011005343 A1 *  9/2012  ......... B29C 44/0476
EP      0639440 A2  *  2/1995  ......... B29C 44/1233

(Continued)

OTHER PUBLICATIONS

Machine translation of German Patent Publication No. DE 102011005343 A1, originally published Sep. 2012, 18 pages.*

(Continued)

*Primary Examiner* — William P Bell
(74) *Attorney, Agent, or Firm* — Reising Ethington P.C.

(57) ABSTRACT

A vehicle interior panel includes a fabric layer with a sculpted feature in the visible decorative surface. The sculpted feature is formed in a cold-forming process, which can produce sharp features in the fabric layer similar to sharp features formed in polymer films by thermoforming. The cold-forming process includes pressing a flat sheet of decorative material that includes the fabric layer onto a curable adhesive before the adhesive cures. After curing, the adhesive holds the decorative sheet of material in a new three-dimensional shape, which can have features that are not attainable by traditional wrapping methods.

20 Claims, 4 Drawing Sheets

(56) References Cited

U.S. PATENT DOCUMENTS

| | | | |
|---|---|---|---|
| 4,046,611 A * | 9/1977 | Sanson | B29C 44/146 156/274.4 |
| 5,096,639 A * | 3/1992 | Hughes | B29C 44/1238 264/257 |
| 5,296,182 A * | 3/1994 | Thary | A41D 27/08 264/257 |
| 5,840,224 A | 11/1998 | Thary | |
| 6,231,940 B1 * | 5/2001 | Aichner | B32B 9/00 428/332 |
| 6,623,815 B2 | 9/2003 | Piec et al. | |
| 7,344,666 B2 | 3/2008 | Cowelchuk et al. | |
| 2001/0033874 A1 * | 10/2001 | Hoogen | B29C 44/1233 425/112 |
| 2005/0025954 A1 * | 2/2005 | Sullivan, Jr. | B29C 45/14811 428/304.4 |
| 2009/0255625 A1 * | 10/2009 | Fox | A43B 13/187 156/247 |
| 2011/0187176 A1 | 8/2011 | Besnard et al. | |
| 2012/0286444 A1 * | 11/2012 | Vasilj | B29C 44/08 264/46.4 |
| 2012/0327673 A1 | 12/2012 | Ureta Hortigüela et al. | |
| 2013/0221698 A1 | 8/2013 | Nowik et al. | |
| 2015/0165656 A1 * | 6/2015 | Kong | B29C 44/3423 264/46.4 |

FOREIGN PATENT DOCUMENTS

| | | | |
|---|---|---|---|
| EP | 1052076 A1 | 11/2000 | |
| EP | 2441578 A2 * | 4/2012 | B29C 44/1257 |
| JP | S56129131 A | 10/1981 | |
| JP | 57193330 A * | 11/1982 | B29C 44/16 |
| JP | 59229324 A * | 12/1984 | B29C 44/16 |
| JP | 2003340913 A | 12/2003 | |
| WO | WO2005065935 A1 | 7/2005 | |
| WO | WO2010010281 A2 | 1/2010 | |

OTHER PUBLICATIONS

Machine translation of Japanese Patent Publication No. JP-57193330A, originally published Nov. 27, 1982, 3 pages.*

Extended European Search Report corresponding to EP application No. 15199623, dated Apr. 26, 2016, 7 pages.

* cited by examiner

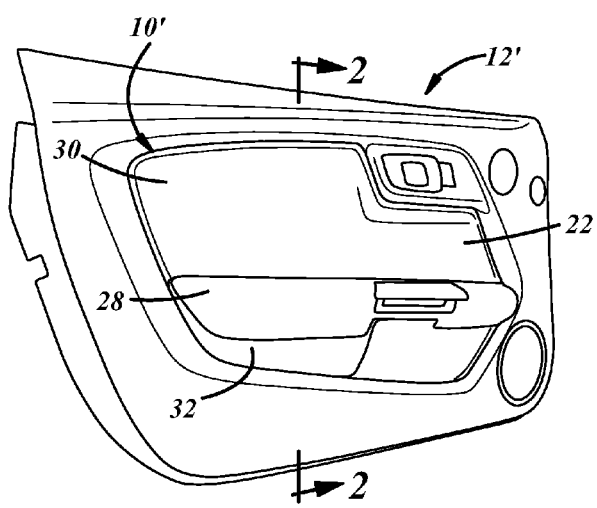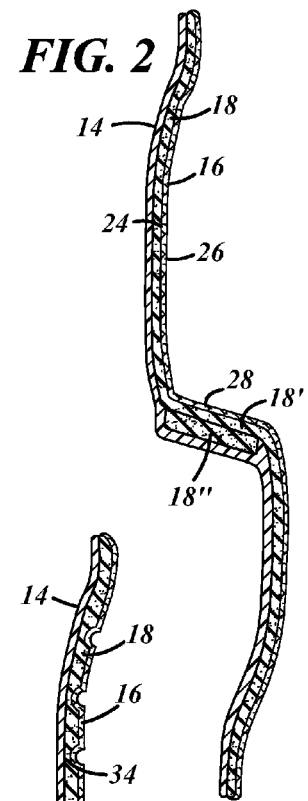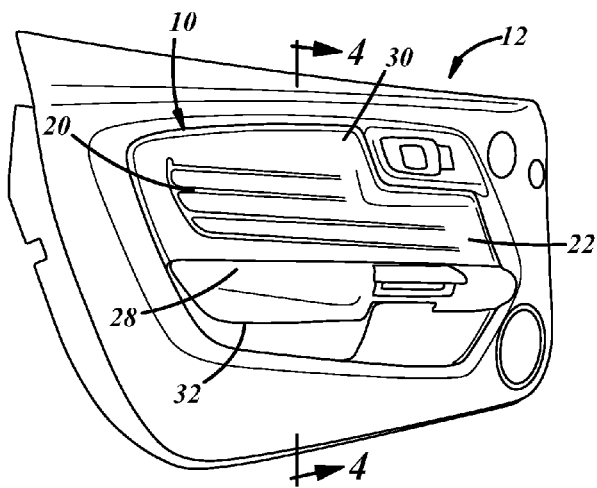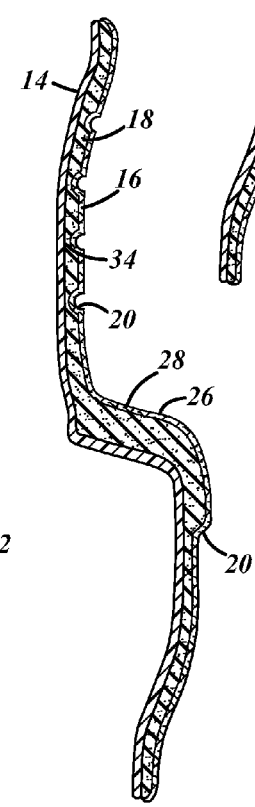

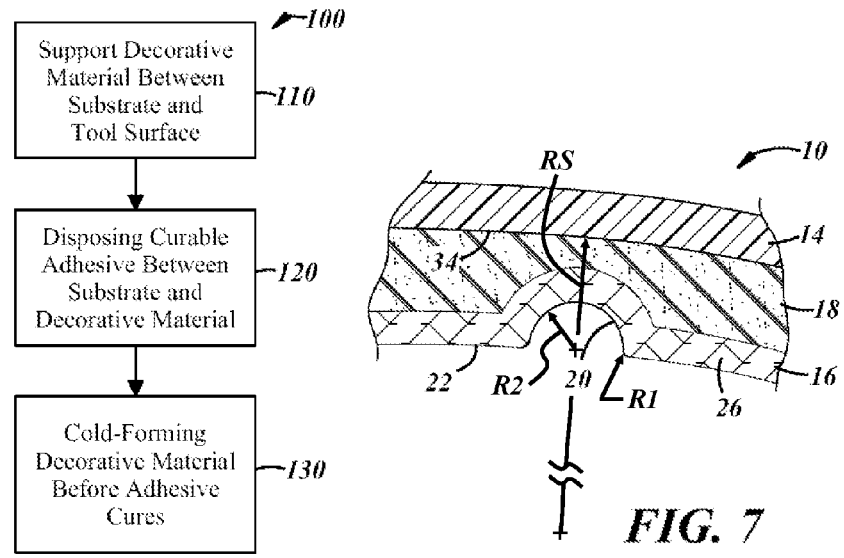
*FIG. 5*
*FIG. 7*
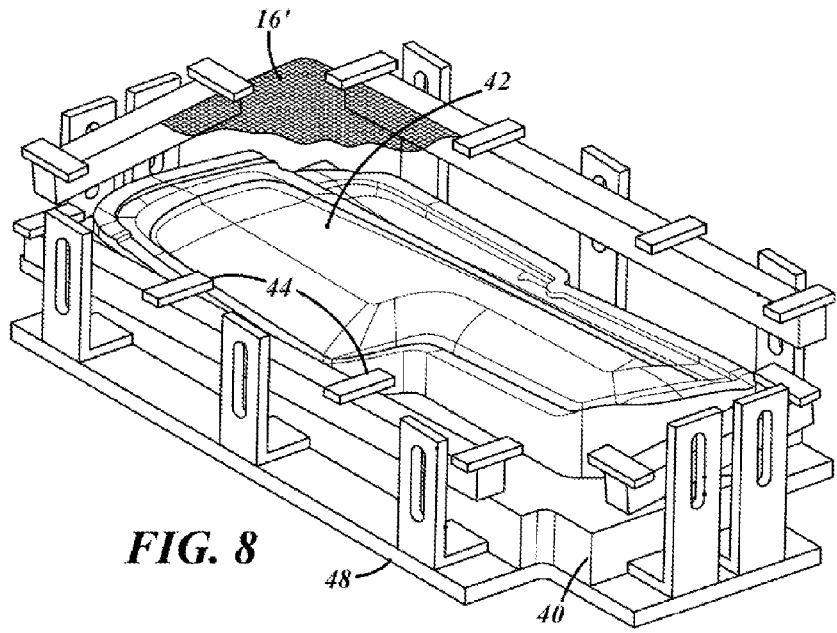
*FIG. 8*

VEHICLE INTERIOR PANEL WITH SCULPTED SURFACE

TECHNICAL FIELD

The present disclosure relates generally to vehicle interior panels with aesthetic features and to a method of providing such aesthetic features.

BACKGROUND

Vehicle interior panels typically include a decorative aspect, providing the passenger cabin of a vehicle with a desired aesthetic. Combinations of different types of materials, textures, shapes, tactile features, and visual features can be used with such panels to provide the passenger cabin with any of a variety of different ambiences, from luxurious to utilitarian. Modern polymer-based materials can be shaped into complex contoured shapes and are used extensively in vehicle interiors due to the available design freedom. Over time, polymer-based material have become commonplace in vehicle interiors, prompting some vehicle manufacturers to seek to differentiate from the commonplace interiors by including different non-polymeric materials, such as leather, fabric, metal, etc. as interior design elements. But the ease of shaping polymer-based materials is lost when these other material types are employed, forcing interior designers to compromise and forego desired shapes and surface contours when non-polymeric materials are desired.

U.S. Patent Application Publication No. 2013/0221698 by Nowik et al. discloses examples of a negative thermoforming process useful to create sharp design features in the decorative surface of interior vehicle covering materials. The process relies on a polymer-based sheet of material that is heated before the intended show surface of the material is pressed against a tool surface. The process is an improvement over positive thermoforming processes in which the back or underside of the sheet is pressed against a tool surface because sharper features can be formed directly into the show surface than through the thickness of the material, particularly when the thickness of the sheet material is relatively high.

SUMMARY

In accordance with at least one embodiment, a method of making a vehicle interior panel includes the steps of: (a) providing a rigid substrate and a cold-forming tool surface facing toward the substrate; (b) supporting a generally flat sheet of decorative material between the substrate and the cold-forming tool surface, said sheet of decorative material having a decorative side facing toward the cold-forming tool surface; (c) disposing a curable adhesive between the substrate and the sheet of decorative material; (d) cold-forming the sheet of decorative material into a three-dimensional sheet by pressing the sheet of decorative material onto the cold-forming tool surface and pressing the curable adhesive against the decorative material with the rigid substrate before the adhesive cures; and (e) moving the cold-forming tool surface and substrate away from each other after the adhesive is sufficiently cured, wherein the adhesive holds the three-dimensional sheet in a shape that is complimentary to a contour of the cold-forming tool surface.

According to at least one embodiment, the sheet of decorative material comprises a fabric layer.

According to at least one embodiment, the fabric layer has a weft direction and a warp direction. The method further includes the step of orienting the sheet of decorative material such that the weft direction and the direction of highest elongation from step (b) to step (e) are generally aligned.

According to at least one embodiment, the substrate includes a surface facing toward the cold-forming tool surface. The substrate surface has a contour that is different from the contour of the cold-forming tool surface, and the cured adhesive has a non-uniform thickness.

According to at least one embodiment, the curable adhesive expands to form a foam material after step (c) and before step (e).

According to at least one embodiment, at least a portion of the sheet of decorative material is in tension in step (b) and in a greater amount of tension in at least one direction in step (d).

According to at least one embodiment, the sheet of decorative material is secured to elastic fixing elements at locations outside the perimeter of the substrate in step (b) such that the elastic fixing elements extend during step (d) to increase the amount of decorative material surface area that is within the perimeter of the substrate during and after step (d).

According to at least one embodiment, the method includs using a cold-forming tool comprising upper and lower portions that move toward each other in step (d) and away from each other in step (e). The substrate is secured to the upper portion before step (d), and the lower portion includes the cold-forming tool surface and supports the generally flat sheet of decorative material over the cold-forming tool surface in step (b).

According to at least one embodiment, step (c) includes pouring the curable adhesive on the sheet of decorative material.

According to at least one embodiment, the method includes using a cold-forming tool comprising upper and lower portions that move toward each other in step (d) and away from each other in step (e). The substrate is supported by the lower portion, and the upper portion includes the cold-forming tool surface and supports the generally flat sheet of decorative material beneath the cold-forming tool surface in step (b).

According to at least one embodiment, step (c) comprises spraying the curable adhesive on the substrate.

In accordance with at least one embodiment, a vehicle interior panel for use in the passenger cabin of a vehicle includes a rigid substrate, a decorative layer disposed over a region of the rigid substrate, and a foam layer interposed between the substrate and the decorative layer. The decorative layer includes a fabric layer and a decorative surface that is visible from the passenger cabin. The foam layer is a continuous layer having a non-uniform thickness along said region of the rigid substrate. The decorative surface includes a sculpted feature having a characteristic radius smaller than an underlying substrate radius.

According to at least one embodiment, the sculpted feature includes a concave shape and the decorative layer is in tension at the concave shape.

According to at least one embodiment, a vehicle interior door panel includes the vehicle interior panel, and the thickness of the foam layer is greater along an armrest portion of the door panel than along a generally vertical portion of the door panel.

According to at least one embodiment, a vehicle interior door panel includes the vehicle interior panel, and the fabric layer has a vertically oriented weft and a horizontally oriented warp.

It is contemplated that the various features set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

One or more embodiments will hereinafter be described in conjunction with the appended drawings, wherein:

FIG. 1 is a perspective view of an interior vehicle panel as part of an interior door panel;

FIG. 2 is a cross-sectional view of the interior vehicle panel of FIG. 1;

FIG. 3 is a perspective view of another interior vehicle panel as part of an interior door panel, including sculpted features;

FIG. 4 is a cross-sectional view of the interior vehicle panel of FIG. 3;

FIG. 5 is a process flow diagram for an illustrative sculpting process;

FIG. 7 is an enlarged cross-sectional view of a sculpted feature of a vehicle interior panel illustrating examples of characteristic radii (R1, R2) of the sculpted feature and an underlying substrate radius (RS).

FIG. 8 is a perspective view of a lower portion of a cold-forming tool;

DETAILED DESCRIPTION

Figure 6:
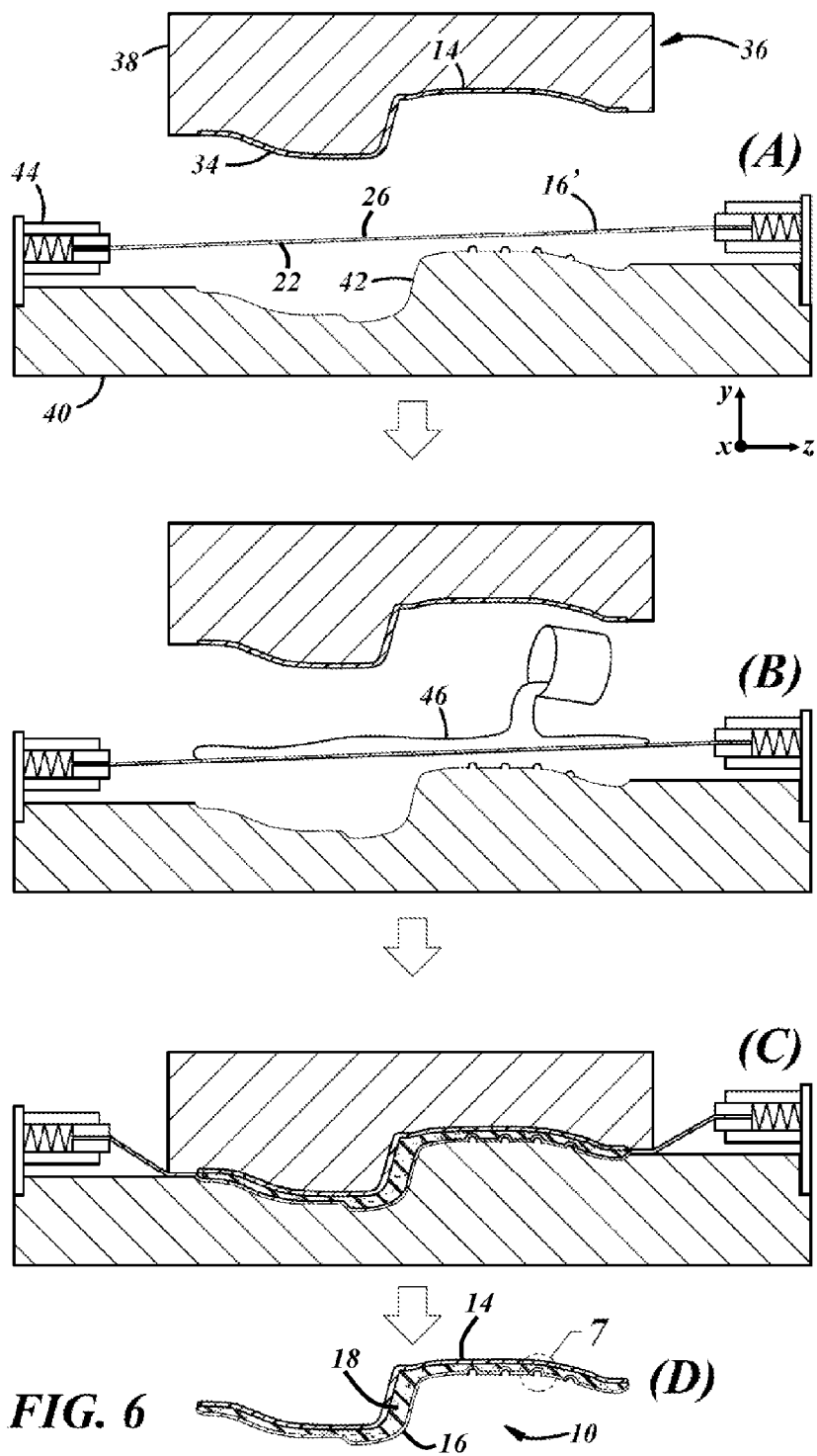
FIG. 6 is a schematic cross-sectional view of a cold-forming tool performing the sculpting process.

Described below is a vehicle interior panel that includes a decorative element including a fabric layer that can be shaped to include a sculpted design feature in the exterior surface of the panel. The panel includes a rigid substrate, an overlying decorative layer comprising fabric, and a foam layer interposed between and bonding the substrate with the decorative layer. A process for making the panel enables sharp and distinct sculpted features in the decorative layer, combining the styling advantages of polymer film surface layers with the complex and desirable textures of fabric materials which, until now, have been limited to smooth or gently sloping surface contours due to the limitations of fabric wrapping or press bonding processes. While described in the context of vehicle interior door panels, the teachings contained herein are applicable to all types of vehicle interior panels, including but not limited to instrument panels, knee bolster panels, storage compartment covers, pillar covers, console panels, roof panels, and/or steering wheel panels, to name a few.

FIGS. 1-4 illustrate two examples of vehicle interior panels 10, 10' as part of interior door panels 12, 12'. Each of these exemplary panels 10, 10' is in the form of an insert panel or medallion that is intended, at least in part, to provide an aesthetic design element with a different shape, contour, color, texture, feel, look, etc. than surrounding portions of the door panel 12, 12' with which it is fitted. Each panel 10, 10' includes a rigid substrate 14, a decorative layer 16 overlying the substrate, and an intermediate layer 18 between the substrate and the decorative layer. The example of FIGS. 3 and 4 includes sculpted features 20 formed in the decorative layer 16, which are described in greater detail below along with a method of forming them.

The rigid substrate 14 provides the basic shape, size, structure, and attachment locations for coupling with and/or concealing underlying vehicle structures and components. As used here, "rigid" is meant to indicate a minimum amount of stiffness or integrity. A substrate is considered rigid if it can support its own weight while maintaining its overall shape. In the context of vehicle interior panels, this may include metals, filled or unfilled plastic materials, composite materials, and/or combinations thereof.

The decorative layer 16 includes an outer decorative side 22 that faces the passenger cabin and an opposite side 24 that faces toward the substrate 14. In embodiments described below, the decorative layer 16 comprises a fabric layer 26. The fabric layer 26 is a woven or non-woven (e.g., knit, spun, etc.) textile material formed from natural or synthetic materials such as fibers (e.g., cotton, wool, nylon, polyester, acrylic, carbon, etc.). At least in embodiments where the fabric layer 26 includes a polymeric material, the polymeric material is not in the form of a solid film layer. The decorative layer 16 may include only a single fabric layer 26, multiple fabric layers, or one or more fabric layer laminated with a non-fabric layer. In one particular example, the decorative layer 16 includes an outermost visible layer of polymeric material, such as vinyl or polyurethane, laminated or otherwise formed together with an underlying fabric layer, such as a woven textile material. Such decorative layers 16 may be commercially available as upholstery fabric.

The intermediate layer 18 may be provided for multiple functions, such as a cushioning layer, an adhesive or bonding layer, or a gap filler, for example. In embodiments described below, the intermediate layer 18 may be formed from an adhesive material that bonds the substrate 14 and the decorative layer 16 together. In some embodiments, the intermediate layer 18 includes one or more foam materials, such as polyurethane or polyolefin foam. The intermediate layer 18 of the panel 10' of FIGS. 1 and 2, for example, includes a first foam material 18' as a layer having generally uniform thickness, along with a block of second foam material 18" to provide additional localized foam thickness. While the panel 10' of FIGS. 1 and 2 may be fabricated using the same or similar method described below for fabricating a panel with a sculpted surface, the panel of FIGS. 1 and 2 may be formed using other methods, such as press bonding with heat, adhesive, and/or pressure.

As apparent in FIG. 2, the decorative and foam layers 16, 18' may be provided as a pre-formed bi-layer laminate material that is pressed against and adhered to the substrate 14 such that the layers 16, 18' have generally the same contour as the substrate surface they face toward. Where additional gap filler or foam cushioning is desired, the second foam material 18" is provided and placed in the desired location before the press bonding process. In the interior door panel application in the illustrated example, additional foam thickness is provide at an armrest portion 28 of the panel 10', which is located between upper and lower vertical portions 30, 32. In the example of FIG. 2, the substrate 14 is specially shaped to accommodate and hold the foam block 18" in place during subsequent processes.

As noted above, the interior vehicle panel 10 of FIGS. 3 and 4 includes sculpted features 20 formed in the decorative layer 16. With reference to FIG. 3, the upper vertical portion 30 of the panel 10 includes a plurality of parallel sculpted features 20. The cross-sectional view of FIG. 4 illustrates another sculpted feature 20 along the lower portion 32 of the panel 10. Sculpted features 20 are named for their appearance, which is reminiscent of shapes cut or carved out of a solid piece of material. Such features 20 may be characterized by certain visual and dimensional characteristics, including sharp (i.e., small radius) surface transitions joining surface portions with significantly different slopes. One visual effect apparent in FIG. 3, particularly in the upper portion 30 of the panel 10, is a shadowing effect that results in the appearance of relatively dark horizontal lines when light strikes the visible side of the panel.

Another characteristic of the vehicle interior panel 10 with sculpted features 20 is the non-uniform thickness of the foam intermediate layer 18. While other vehicle interior panels without sculpted features may include non-uniformly thick foam layers, such as back-filled foam layers, known processes are not capable of producing non-uniformly thick foam layers with sculpted or otherwise sharp features in a decorative layer that comprises a fabric layer. Fabric layers are generally unaffected by thermoforming processes, and pre-laminated bi-layer materials have a maximum thickness limited to the nominal thickness of the laminate. And unlike the intermediate layer 18 illustrated in FIG. 2, which includes multiple material layers 18', 18", the intermediate layer 18 of FIG. 4 is a continuous foam layer formed as a single element with the same material.

Sculpted features 20 may also be characterized by various dimensional and/or geometric features. As apparent in FIGS. 2 and 4, for example, a decorative layer 16 with sculpted features 20 has a contour that is different from a contour of a surface 34 of the substrate 14 that directly underlies the sculpted feature. The magnitude or degree of the difference in contour is one indicator of whether a particular surface feature is a sculpted feature. In one embodiment, each sculpted feature 20 has a cross-sectional slope of 30° or more relative to the underlying substrate surface 34. In other words, the sculpted feature has a flat surface that forms an angle of 30° or more with the underlying substrate surface 34 or a curved surface with a tangent line that forms an angle of 30° or more with the substrate surface 34. In other embodiments, each sculpted feature 20 has a cross-sectional slope of 45° or more relative to the underlying substrate surface 34.

In various embodiments, sculpted features 20 include adjacent surface portions with opposite slopes and an included angle of 150° or less, 120° or less, and 90° or less. In various embodiments, the thickness of the intermediate layer 18 at sculpted features 20 is 75% or less, 50% or less, and 30% or less than a nominal thickness of the intermediate layer. In various other embodiments, sculptured features 20 include a minimum radius include adjacent surface portions with opposite slopes and an included angle of 150° or less, 120° or less, and 90° or less.

The sharpness of a feature is also related to the size of the smallest radius. One manner of characterizing the smallest radius of a feature is by comparison to a related radius. In one embodiment, sculpted features 20 have a minimum radius that is less that a radius of the substrate surface directly underlying the minimum radius. In another embodiment, sculpted features have a minimum radius that is equal to or less than the nominal thickness of the intermediate layer 18.

Another characteristic of sculpted features 20 is that the decorative layer 18 of the panel is in tension, as will become apparent in the description of the sculpting process below. Concave surface features with the decorative layer 18 in tension may be particularly characteristic of sculpted features since certain other processes such as foam-backfilling behind a polymer film decorative layer may result in a convex surface in tension.

FIG. 5 is a process flow diagram for an illustrative sculpting process 100, which includes supporting decorative material between the substrate and a tool surface (step 110), disposing a curable adhesive between the substrate and the decorative material (step 120), and cold-forming the decorative material before the adhesive cures (step 130). Various embodiments of the process and processing equipment are described below.

FIG. 6 schematically illustrates one example of the sculpting process consistent with FIG. 5, including the use of a cold-forming tool 36. In FIG. 6(A), a rigid substrate 14 is provided and affixed to an upper portion 38 of the cold-forming tool 36 via vacuum or other means. A lower portion 40 of the tool 36 includes a cold-forming tool surface 42 facing toward the substrate 14 and opposing the substrate surface 34. A generally flat sheet of decorative material 16' is supported between the substrate 14 and the tool surface 42 with the decorative side 22 facing downward toward the tool surface 42. More particularly, the sheet of decorative material 16' is supported by the lower portion 40 of the tool 36. The sheet of decorative material 16' is grasped or otherwise restrained at a plurality of locations outside and surrounding the perimeter of the substrate 14. In this example the lower portion 40 of the tool includes an elastic fixing element 44 at each location about the perimeter of the substrate 14. The elastic fixing elements 44 are spring-loaded or otherwise configured to extend and allow a greater amount of the sheet of decorative material 16' to move within the perimeter of the substrate 14 when the material is stretched or subjected to a higher amount of tension in subsequent steps. Each fixing element 44 may have an adjustable pre-load to selectively increase or decrease the amount of tension in different portions of the decorative material 16' before and during cold-forming. The elastic fixing elements 44 may thus be used to control the flow of decorative material from outside the perimeter of the substrate 14 to within the projected area of the substrate.

FIG. 6(B) shows a curable adhesive material 46 in the form of a viscous liquid disposed between the substrate 14 and the sheet of decorative material 16'. More particularly, in this example, the curable adhesive 46 is disposed along the decorative material 16' on a side 24 that is opposite the decorative side 22 and that faces upward toward the substrate 14. The viscous liquid 46 may be a reactive mixture, such as a two-component polyurethane mixture, a viscous polymer-based liquid with a foaming agent, or some other curable adhesive capable of flowing between the decorative material 16' and the substrate 14 in subsequent steps and bonding the decorative material with the substrate when cured. In one embodiment, the curable adhesive 46 is formulated to form a foam material as the intermediate layer 18 of the panel 10 when it cures. The curable adhesive 46 may be disposed between the substrate 14 and decorative material 16' by a variety of techniques, including manually or automatically pouring a measured amount of viscous liquid within an area on the decorative material 16' corresponding to the projected area of the substrate 14. In another embodiment, the curable adhesive is sprayed onto the decorative material 16'. A relatively larger amount of curable adhesive may be disposed at locations corresponding to areas of the finished panel where it is desired to have a greater intermediate layer 18 thickness.

FIG. 6(C) illustrates the cold-forming tool 36 in a closed position after the upper portion 38 and/or lower portion 40 of the tool are moved toward each other. The cold-forming process is so-named because it does not rely on thermal energy to change the shape of the sheet of decorative material 16' like some other forming or processes (e.g., thermoforming, vacuum thermoforming, press bonding, etc.). In some cases, heat may be provided to help accelerate curing of the curable adhesive, for example. The cold-forming process is particularly useful with decorative material layers 16 that include a fabric layer, as such materials are generally not formable with heat. The cold-forming process may also be useful with certain other decorative layers 16 that do not include a fabric layer.

During the cold-forming process, the curable adhesive 46 is squeezed between the substrate 14 and sheet of decorative material 16' while the sheet of decorative material is stretched and/or drawn between the tool portions 38, 40. The generally flat sheet of decorative material 16' is formed into a three-dimensional sheet which becomes the decorative layer 16 of the finished panel 10 by being pressed against the cold-forming tool surface 42 by a combination of forces provided by the substrate 14 and the curable adhesive 46. The tool 36 is configured such that, in the closed position, a cavity volume is defined between the tool surface 42 and the substrate surface 34. When the tool 36 is first brought into the closed position, the sheet of decorative material 16' occupies a portion of the cavity volume, and the curable adhesive 46 occupies another portion of the cavity volume.

In embodiments where the curable adhesive 46 is a foamable material, the cavity volume may be partially unfilled when the tool 36 is initially brought into the closed position. Further, when the cavity volume is not completely filled, the decorative side 22 of the sheet of decorative material 16' may not be in full surface contact with the cold-forming tool surface 42, because the sheet of material is in tension and will span recesses in the tool surface when the volume cavity is partially empty. When the curable adhesive 46 begins to react to form a foam material, the free volume in the cavity is decreased and eventually eliminated when a sufficient amount of curable adhesive is used. The volumetric expansion of the curable adhesive increases the pressure in the cavity volume and thereby presses the decorative side 22 of the sheet of decorative material 16' into full-surface contact with the tool surface 42, where the decorative material becomes a three-dimensional sheet with a shape defined by a contour of the tool surface 42.

The tool 36 remains in the closed position of FIG. 6(C) until the adhesive 46 is sufficiently cured or hardened, at which time the tool portions 38, 40 can be moved apart with the cured adhesive holding the three-dimensional sheet of decorative material in the defined shape, which is complimentary to the cold-forming tool surface 42, when the finished panel 10 is removed from the cold-forming tool 36, as shown in FIG. 6(D).

Sculpted features 20 thus have shapes and dimensions determined by the contour of the cold-forming tool surface 42. The contour of the cold-forming tool surface 42 may be different from that of the substrate surface 34, thereby defining a final intermediate layer 18 having a non-uniform thickness. Additional foam thickness can easily be added at the armrest portion of the interior door panel by shaping the cold-forming tool surface 42 accordingly.

FIG. 7 is a cross-sectional view of a portion of a vehicle interior panel 10 with a sculpted feature 20 formed in the decorative layer 16. This view more clearly illustrates certain features and elements of the panel 10 with a cured adhesive foam intermediate layer 18 between a surface 34 of the substrate 14 and the decorative layer 16. The decorative layer 16 in this case is a single fabric layer 26. The sculpted feature 20 meets several of the above-listed criteria. The decorative layer 16 has a contour at the decorative side 22 that may be defined by the contour of a cold-forming tool surface, as shown in FIG. 6.

FIG. 8 is a perspective view of one example of a portion 40 of a cold-forming tool, similar to the lower portion of the cold-forming tool 36 of FIG. 6. Tool portion 40 includes a tensioner frame 48 with the plurality of elastic fixing elements 44 arranged therealong and surrounding the cold-forming tool surface 42 that is configured to form sculpted features in the decorative layer 16 with which it comes into contact during the sculpting process. The illustrated tool portion 40 is also compatible with the process illustrated in FIG. 9 as the upper tool portion.

Figure 9:
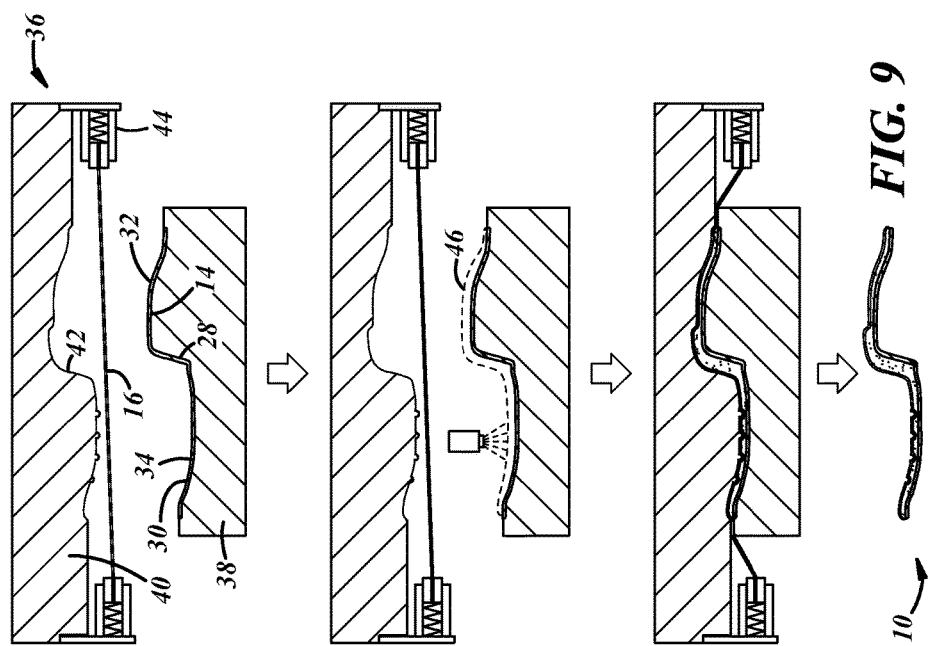
FIG. 9 is a schematic cross-sectional view of another cold-forming tool performing the sculpting process.

Another embodiment of the sculpting process is illustrated in FIG. 9, also consistent with the process of FIG. 5. In this example, nearly all of the individual elements of the cold-forming tool 36 are the same as those in FIG. 6, except that the tool portion 40 with the cold-forming tool surface 42 and the elastic fixing elements 44 supporting the sheet of decorative material 16' between the substrate 14 and the tool surface 42 is the upper portion of the tool 36. Similarly, the tool portion 38 that supports the substrate 14 with substrate surface 34 facing toward the tool surface 42 and the decorative material 16' is the lower portion, in this example. As shown in FIG. 9(B), the curable adhesive 46 may be disposed between the decorative material 16' and the substrate 14 by spray application of the curable adhesive on the substrate 14. In this example, where the shape of the substrate includes significant bends (e.g., near 90° bends where the armrest portion 28 meets the upper and lower vertical portions 30, 32), the spray process may be preferred over pouring methods to sufficiently distribute the adhesive 46. The spray process also offers the advantage of slowing spray gun movement at locations where higher foam thickness is required.

Figure 10:
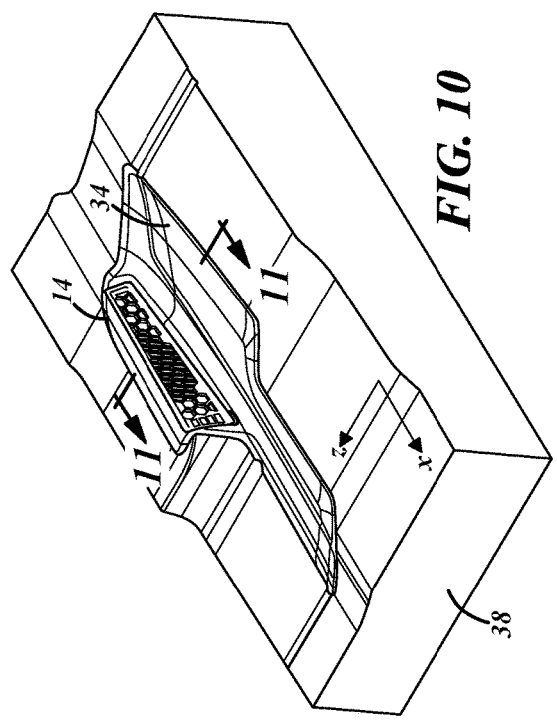
FIG. 10 is a perspective view of a lower portion of another cold-forming tool.

FIG. 10 is a perspective view of the tool portion 38 configured to support the substrate 14 with the substrate surface 34 facing toward the cold-forming tool surface. Tool portion 38 is the upper tool portion in FIG. 6 and the lower tool portion in FIG. 9. The substrate 14 may be secured to the tool portion 38 by vacuum ports at the tool portion surface or by any other suitable means.

Figure 11:
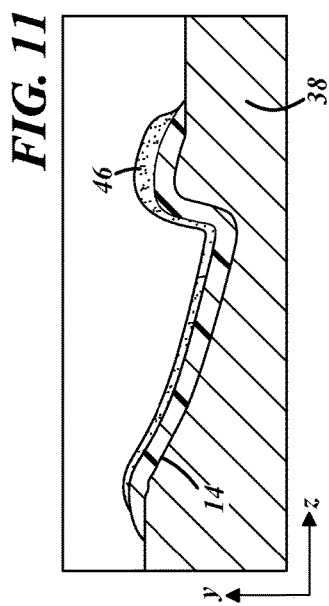
FIG. 11 is a cross-sectional view of the lower portion of the cold-forming tool of FIG. 10.

FIG. 11 is a cross-sectional view of the tool portion 38 of FIG. 10, with a layer of curable adhesive 46 applied over the upwardly facing surface 34 and with the curable adhesive applied with a greater thickness at the armrest portion of the substrate 14.

FIGS. 10 and 11 are also used here to indicate the preferential orientation for decorative layers that include a woven fabric layer. Woven fabric layers, whether woven from natural or synthetic fibers, include a waft and a warp direction. It may be preferable to orient the generally flat sheet of decoration material such that the waft is aligned with the direction of highest material elongation, which it the z-direction in FIGS. 10 and 11. The warp direction of a woven fabric is the stronger direction with less elongation or "give" in the fabric layer, while the waft direction has more elongation.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel, comprising the steps of:
   (a) providing a rigid substrate and a cold-forming tool surface facing toward the substrate;
   (b) supporting a generally flat sheet of decorative material between the substrate and the cold-forming tool surface, said sheet of decorative material having a decorative side facing toward the cold-forming tool surface;
   (c) disposing a curable adhesive between the substrate and the generally flat sheet of decorative material;
   (d) cold-forming the sheet of decorative material into a three-dimensional sheet by simultaneously:
      1) pressing the sheet of decorative material onto the cold-forming tool surface, and
      2) pressing the curable adhesive against the decorative material with the rigid substrate before the adhesive cures; and
   (e) moving the cold-forming tool surface and substrate away from each other after the adhesive is sufficiently cured, wherein the cured adhesive forms an intermediate layer that bonds the substrate and the decorative material together and holds the three-dimensional sheet in a shape that is complimentary to a contour of the cold-forming tool surface,
   wherein the sheet of decorative material supported between the substrate and the cold-forming tool surface in step (b) and cold-formed in step (d) does not include a pre-formed foam layer so that the intermediate layer is a continuous layer formed as a single element with the same material, and
   wherein the sheet of decorative material is secured to elastic fixing elements at locations outside the perimeter of the substrate in step (b), the elastic fixing elements being configured to allow decorative material located outside the perimeter of the substrate in step (b) to flow inside the perimeter of the substrate during step (d) to thereby increase the amount of decorative material that is within the perimeter of the substrate during and after step (d).

2. The method of claim 1, wherein the sheet of decorative material comprises a fabric layer.

3. The method of claim 2, wherein the fabric layer has a weft direction and a warp direction, the method further comprising the step of orienting the sheet of decorative material such that the weft direction and the direction of highest elongation from step (b) to step (e) are generally aligned.

4. The method of claim 1, wherein the substrate comprises a surface facing toward the cold-forming tool surface, said substrate surface having a contour that is different from said contour of the cold-forming tool surface, whereby the cured adhesive has a non-uniform thickness.

5. The method of claim 1, wherein said curable adhesive expands to form a foam material after step (c) and before step (e) so that the continuous layer formed as a single element is a continuous foam layer.

6. The method of claim 1, wherein at least a portion of the sheet of decorative material is in tension in step (b) and in a greater amount of tension in at least one direction in step (d).

7. The method of claim 1, wherein each fixing element is adjustable to selectively increase or decrease the amount of tension in different portions of the sheet of decorative material while secured thereby.

8. The method of claim 1, further comprising using a cold-forming tool comprising upper and lower portions that move toward each other in step (d) and away from each other in step (e), wherein the substrate is secured to said upper portion before step (d), and wherein the lower portion includes the cold-forming tool surface and supports the generally flat sheet of decorative material over the cold-forming tool surface in step (b).

9. The method of claim 8, wherein step (c) comprises pouring the curable adhesive on the sheet of decorative material.

10. The method of claim 1, further comprising using a cold-forming tool comprising upper and lower portions that move toward each other in step (d) and away from each other in step (e), wherein the substrate is supported by the lower portion, and wherein the upper portion includes the cold-forming tool surface and supports the generally flat sheet of decorative material beneath the cold-forming tool surface in step (b).

11. The method of claim 10, wherein step (c) comprises spraying the curable adhesive on the substrate.

12. The method of claim 1, wherein the three-dimensional sheet includes a sculpted feature after step (e).

13. The method of claim 12, wherein the sculpted feature has a concave shape.

14. The method of claim 1, wherein the panel is a vehicle interior door panel and a thickness of the cured adhesive is greater along an armrest portion of the door panel than along a generally vertical upper or lower portion of the door panel.

15. The method of claim 12, wherein the sculpted feature has a minimum radius that is equal to or less than a nominal thickness of the intermediate layer.

16. The method of claim 12, wherein the sculpted feature has a minimum radius along the decorative side of the decorative material that is less than a thickness of the decorative material at the sculpted feature.

17. A method of making a vehicle interior panel, comprising the steps of:
   (a) providing a rigid substrate and a cold-forming tool surface facing toward the substrate;
   (b) supporting a generally flat sheet of decorative material between the substrate and the cold-forming tool surface, said sheet of decorative material having a decorative side facing toward the cold-forming tool surface;
(c) pouring a curable adhesive onto the generally flat sheet of decorative material;
(d) cold-forming the sheet of decorative material into a three-dimensional sheet by simultaneously:
   1) pressing the sheet of decorative material onto the cold-forming tool surface, and
   2) pressing the curable adhesive against the decorative material with the rigid substrate before the adhesive cures; and
(e) moving the cold-forming tool surface and substrate away from each other after the adhesive is sufficiently cured, wherein the cured adhesive forms an intermediate layer that bonds the substrate and the decorative material together and holds the three-dimensional sheet in a shape that is complimentary to a contour of the cold-forming tool surface.

18. The method of claim 17, wherein the sheet of decorative material supported between the substrate and the cold-forming tool surface in step (b) and cold-formed in step (d) does not include a pre-formed foam layer so that the intermediate layer is a continuous layer formed as a single element with the same material.

19. The method of claim 17, wherein the sheet of decorative material is secured to elastic fixing elements at locations outside the perimeter of the substrate in step (b), the elastic fixing elements being configured to allow decorative material located outside the perimeter of the substrate in step (b) to flow inside the perimeter of the substrate during step (b) to thereby increase the amount of decorative material that is within the perimeter of the substrate during and after step (d).

20. The method of claim 19, wherein each fixing element is adjustable to selectively increase or decrease the amount of tension in different portions of the sheet of decorative material while secured thereby.

* * * * *